US008851102B2

(12) United States Patent (10) Patent No.: US 8,851,102 B2
Lacoste et al. (45) Date of Patent: Oct. 7, 2014

(54) WINDSHIELD WASHER FLUID SUPPLYING SYSTEM AND METHOD

(76) Inventors: Francine Lacoste, Longueuil (CA);
Michel Pigeon, Longueuil (CA)

( * ) Notice: Subject to any disclaimer, the term of this patent is extended or adjusted under 35 U.S.C. 154(b) by 341 days.

(21) Appl. No.: 13/259,889

(22) PCT Filed: Mar. 29, 2010

(86) PCT No.: PCT/CA2010/000476
§ 371 (c)(1),
(2), (4) Date: Sep. 23, 2011

(87) PCT Pub. No.: WO2010/108286
PCT Pub. Date: Sep. 30, 2010

(65) Prior Publication Data
US 2012/0012187 A1    Jan. 19, 2012

Related U.S. Application Data

(60) Provisional application No. 61/163,912, filed on Mar. 27, 2009.

(51) Int. Cl.
*B67D 1/08*    (2006.01)
*B65D 47/14*    (2006.01)
*F04F 10/00*    (2006.01)
*B60S 1/50*    (2006.01)

(52) U.S. Cl.
CPC ......................................... *B60S 1/50* (2013.01)
USPC ........... 137/152; 137/571; 137/145; 137/124; 141/18; 141/35; 141/382; 215/4

(58) Field of Classification Search
USPC ......... 137/571, 572, 124, 125, 145, 152, 153; 220/562; 141/18, 35, 382; 215/4
See application file for complete search history.

(56) References Cited

U.S. PATENT DOCUMENTS

| 1,998,387 A | 4/1935 | Rogers |
| 2,673,762 A | 3/1954 | Doyle, Jr. |
| 3,265,262 A | 8/1966 | Motsinger |
| 3,414,317 A | 12/1968 | Mortimer |

(Continued)

OTHER PUBLICATIONS

International Preliminary Report on Patentability for PCT/CA2010/000476 dated Sep. 27, 2011.

(Continued)

*Primary Examiner* — Atif Chaudry
(74) *Attorney, Agent, or Firm* — Nixon Peabody LLP (57) ABSTRACT

A windshield washer fluid supplying system for a vehicle having a windshield washer device comprising a reservoir mounted in the vehicle for storing washer fluid is disclosed, the supplying system comprising a supplying tube having a first end portion and a second end portion; a first end piece comprising a portion mountable on the reservoir and an aperture therethrough for receiving the first end portion of the supplying tube so as to enable fluid communication between the first end portion of the supplying tube and the reservoir; and a second end piece comprising a portion adapted for mounting on a container of washer fluid placed in the vehicle and an aperture therethrough for receiving the second end portion of the supplying tube so that the second end portion of the supplying tube extends inside the container proximate a bottom portion thereof when the second end piece is mounted on the container, thereby establishing a siphonage circuit between the reservoir and the container with the supplying tube for enabling distribution of the washer fluid from the container to the reservoir.

16 Claims, 6 Drawing Sheets

(56) References Cited

U.S. PATENT DOCUMENTS

| | | | |
|---|---|---|---|
| 3,669,297 A * | 6/1972 | Willinger | 210/94 |
| 4,000,835 A * | 1/1977 | Bassett et al. | 222/183 |
| 4,161,287 A | 7/1979 | Brown | |
| 4,444,358 A * | 4/1984 | Spohn et al. | 239/284.1 |
| 4,453,895 A | 6/1984 | Hauk | |
| 5,000,333 A | 3/1991 | Petrelli | |
| 5,024,383 A | 6/1991 | Vaschetto et al. | |
| 5,327,613 A | 7/1994 | Ohtsu | |
| 5,460,420 A | 10/1995 | Perkins et al. | |
| 5,779,096 A | 7/1998 | Cockfield | |
| 5,810,247 A | 9/1998 | Petroff | |
| 5,853,025 A | 12/1998 | Daneshvar | |
| 6,044,517 A | 4/2000 | Zendler et al. | |
| 6,237,627 B1 * | 5/2001 | Boule | 137/571 |
| 6,341,628 B1 * | 1/2002 | Burson | 141/67 |
| 6,910,509 B1 * | 6/2005 | Wheeler et al. | 141/2 |
| 7,216,818 B2 | 5/2007 | Lee | |

OTHER PUBLICATIONS

International Search Report and Written Opinion for PCT/CA2010/000476 dated Jul. 12, 2010.

* cited by examiner

WINDSHIELD WASHER FLUID SUPPLYING SYSTEM AND METHOD

CROSS REFERENCE TO RELATED APPLICATIONS OR PRIORITY CLAIM

This application is a national phase of International Application No. PCT/CA2010/000476, entitled "WINDSHIELD WASHER FLUID SUPPLYING SYSTEM AND METHOD", which was filed on Mar. 29, 2010, and which claims priority of U.S. Provisional Patent Application No. 61/163,912, filed Mar. 27, 2009, the contents of which are incorporated herein by reference.

FIELD OF THE INVENTION

The invention relates to windshield washer systems used in vehicles. More precisely, this invention pertains to a windshield washer fluid supplying system for a vehicle and an associated method.

BACKGROUND OF THE INVENTION

Nowadays, most vehicles are provided with a windshield washer device devised to spray windshield washer fluid on the windshield of the vehicle when operated by a driver for cleaning the windshield with the operation of one or two windshield wipers.

Such windshield washer devices comprise a windshield washer fluid reservoir mounted on the vehicle, generally at the fore part of the vehicle, a pump, tubing and one or more jet nozzles for spraying the washer fluid on the windshield.

Some of vehicles are also provided with an additional jet nozzle and the associated tubing for spraying washer fluid on the back window.

In some particular circumstances, for example in a harsh environment such as during winter in Montreal, Canada, these windshield washer devices may be of utmost importance for ensuring that the driver of the vehicle has a good vision of the surroundings and therefore that his security and that of the other drivers is not compromised.

In these particular circumstances, a driver may have to activate the windshield washer device very often, thereby using a lot of washer fluid.

When the reservoir is empty, the driver may need to stop the vehicle and refill the reservoir with new washer fluid. If the driver does not anticipate enough its use of washer fluid or if he is traveling a long trip in harsh conditions, he may have to stop at the next gas station or find a convenience store for obtaining a container of washer fluid before refilling the reservoir, which is not very practical.

Refilling the reservoir is generally an easy operation but it could sometimes become cumbersome. Indeed, the reservoir is often installed proximate the engine block and is therefore generally covered with a lot of grease or dirty elements. Thus, it may be difficult to proceed to the refilling of the reservoir without getting its hands dirty.

Moreover, in Canada, during the winter, weather may be so cold and harsh that it may complicate even more the refilling procedure, particularly for users that do not dispose of an indoor parking spot.

Furthermore, sometimes, the driver may need to stop his vehicle on the side of the road for refilling the reservoir. This may be dangerous for his security, particularly when weather conditions compromise the overall visibility.

There is therefore a need for a system and a method that will overcome at least one of the above-mentioned drawbacks.

BRIEF SUMMARY

It is an object of the invention to provide a system that satisfies at least one of the above-mentioned needs.

Accordingly, there is provided a windshield washer fluid supplying system for a vehicle having a windshield washer device comprising a reservoir mounted in the vehicle for storing washer fluid, the supplying system comprising a supplying tube having a first end portion and a second end portion; a first end piece comprising a portion mountable on the reservoir and an aperture therethrough for receiving the first end portion of the supplying tube so as to enable fluid communication between the first end portion of the supplying tube and the reservoir; and a second end piece comprising a portion adapted for mounting on a container of washer fluid placed in the vehicle and an aperture therethrough for receiving the second end portion of the supplying tube so that the second end portion of the supplying tube extends inside the container proximate a bottom portion thereof when the second end piece is mounted on the container, thereby establishing a siphonage circuit between the reservoir and the container with the supplying tube for enabling distribution of the washer fluid from the container to the reservoir.

The windshield washer fluid supplying system provides to the user an increased autonomy with respect to the available volume of washer fluid, which is of great advantage.

Moreover, the windshield washer fluid supplying system may be easily mounted on most types of vehicle, which is of great advantage.

Furthermore, the windshield washer fluid supplying system may be manufactured at a low cost, which is also of great advantage.

In one embodiment, the supplying tube comprises caoutchouc tubing.

In another embodiment, the supplying tube comprises rubber tubing.

In yet another embodiment, the supplying tube comprises metal tubing.

In one embodiment, the container comprises an upper opening having a screw thread and a screw cap screwable on the screw thread for tightly closing the container, the cap comprising a cap aperture for receiving therethrough the second end portion of the supplying tube.

In one embodiment, the windshield washer fluid supplying further comprises retaining means for retaining the second end portion of the supplying tube in the aperture of the second end piece.

In a further embodiment, the retaining means is selected from the group consisting of a spring washer, a flexible ring, a tie-wrap and an adhesive element.

In one embodiment, the first end piece comprises an inverted funnel having a flared neck adapted for snuggly mounting on the upper opening of the reservoir.

In a further embodiment, the inverted funnel comprises a resilient material. In still a further embodiment, the resilient material is selected from the group consisting of caoutchouc and rubber.

In a further embodiment, the inverted funnel comprises a plurality of protruding elements extending on an inner side thereof.

In a further embodiment, each of the protruding elements comprises a disk extending around the inner side of the inverted funnel.

In one embodiment, the first end piece comprises a non-inverted funnel adapted to be mounted inside the upper opening of the reservoir, the aperture of the first end piece extending in a lower portion thereof.

In a further embodiment, the non-inverted funnel comprises a resilient material. In still a further embodiment, the resilient material is selected from the group consisting of caoutchouc and rubber.

In a further embodiment, the non-inverted funnel comprises a plurality of protruding elements extending on an outer side thereof and projecting outwardly thereof.

In still a further embodiment, each of the protruding elements comprises a disk extending around the non-inverted funnel.

In one embodiment, the non-inverted funnel has a lower portion insertable in the upper opening of the reservoir and an upper portion foldable on the reservoir.

In one embodiment, the first end piece comprises first end piece attaching means for attaching said first end piece on the reservoir. In a further embodiment, the first end piece attaching means is selected from the group consisting of a spring washer, a flexible ring, a tie-wrap and an adhesive strap.

In one embodiment, the second end portion of the supplying tube comprises a Y-branch having a plurality of ends for respectively connecting the container and a plurality of additional containers thereto.

In one embodiment, the windshield washer fluid supplying system further comprises a rack mountable inside the vehicle for holding the container in place.

In one embodiment, the vehicle is selected from the group consisting of a car, a truck, a tractor and a boat.

According to another aspect, there is also provided a method for supplying windshield washer fluid to a windshield washer device of a vehicle having a reservoir, the method comprising providing a container of windshield washer fluid; placing the container in the vehicle; providing a supplying tube having a first end portion and a second end portion; and operatively connecting the first end portion of the supplying tube to the reservoir and the second end portion of the supplying tube to the container to thereby establish a fluid circuit between the container and the reservoir for enabling distribution of the washer fluid from the container to the reservoir.

In one embodiment, the processing step of operatively connecting comprises mounting a first end piece on the reservoir and mounting a second end piece on the container.

According to another aspect, there is also provided a kit of a windshield washer fluid supplying system for a vehicle having a windshield washer device comprising a reservoir mounted in the vehicle for storing washer fluid, the supplying system comprising a supplying tube having a first end portion and a second end portion; a first end piece comprising a portion mountable on the reservoir and an aperture therethrough for receiving the first end portion of the supplying tube so as to enable fluid communication between the first end portion of the supplying tube and the reservoir; and a second end piece comprising a portion adapted for mounting on a container of washer fluid placed in the vehicle and an aperture therethrough for receiving the second end portion of the supplying tube so that the second end portion of the supplying tube extends inside the container proximate a bottom portion thereof when the second end piece is mounted on the container, thereby establishing a siphonage circuit between the reservoir and the container with the supplying tube for enabling distribution of the washer fluid from the container to the reservoir.

BRIEF DESCRIPTION OF THE DRAWINGS

These and other objects and advantages of the invention will become apparent upon reading the detailed description and upon referring to the drawings in which.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

There is disclosed a windshield washer fluid supplying system providing to its user an increased volume of available washer fluid. The system enables to reduce the frequency at which a user has to refill the reservoir of washer fluid, thereby reducing the number of undesired stops of the vehicle and the associated accident risks.

Indeed, as it will become apparent upon the reading of the present description, the user will no more have to open the hood of the vehicle to refill the reservoir of washer fluid, which is of great advantage.

As it will be more clearly detailed thereinafter, the system is very easy to install, even for a user that is not versed in the automotive industry. Moreover, as it will become apparent upon reading of the present description, the system may be installed on most types of vehicles without requiring complex mounting steps nor modifying the original elements of the vehicle, which is of great advantage.

The skilled addressee will also appreciate that the system may be easily removed from the vehicle and the original elements replaced without affecting integrity of the vehicle.

Figure 1:
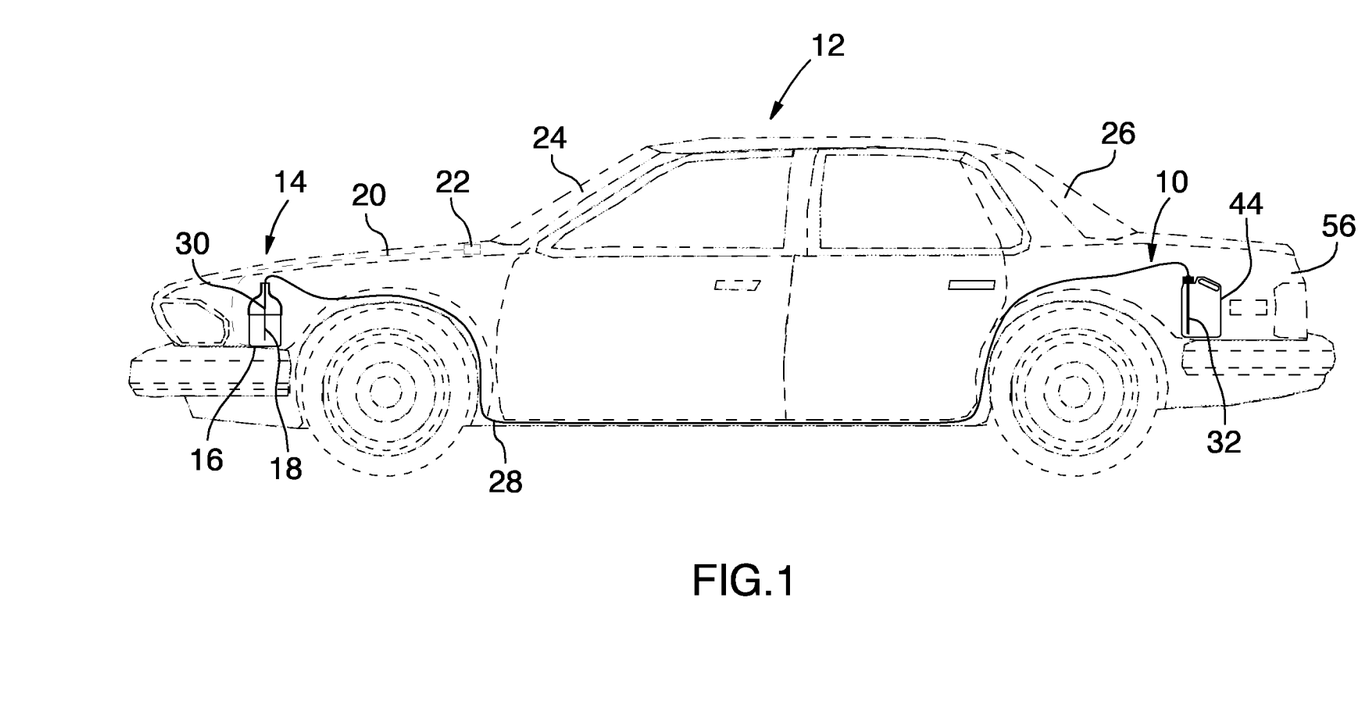
FIG. 1 is a side view of a windshield washer fluid supplying system mounted in a vehicle in accordance with one embodiment, the vehicle being shown in dotted lines.
Figure 2:
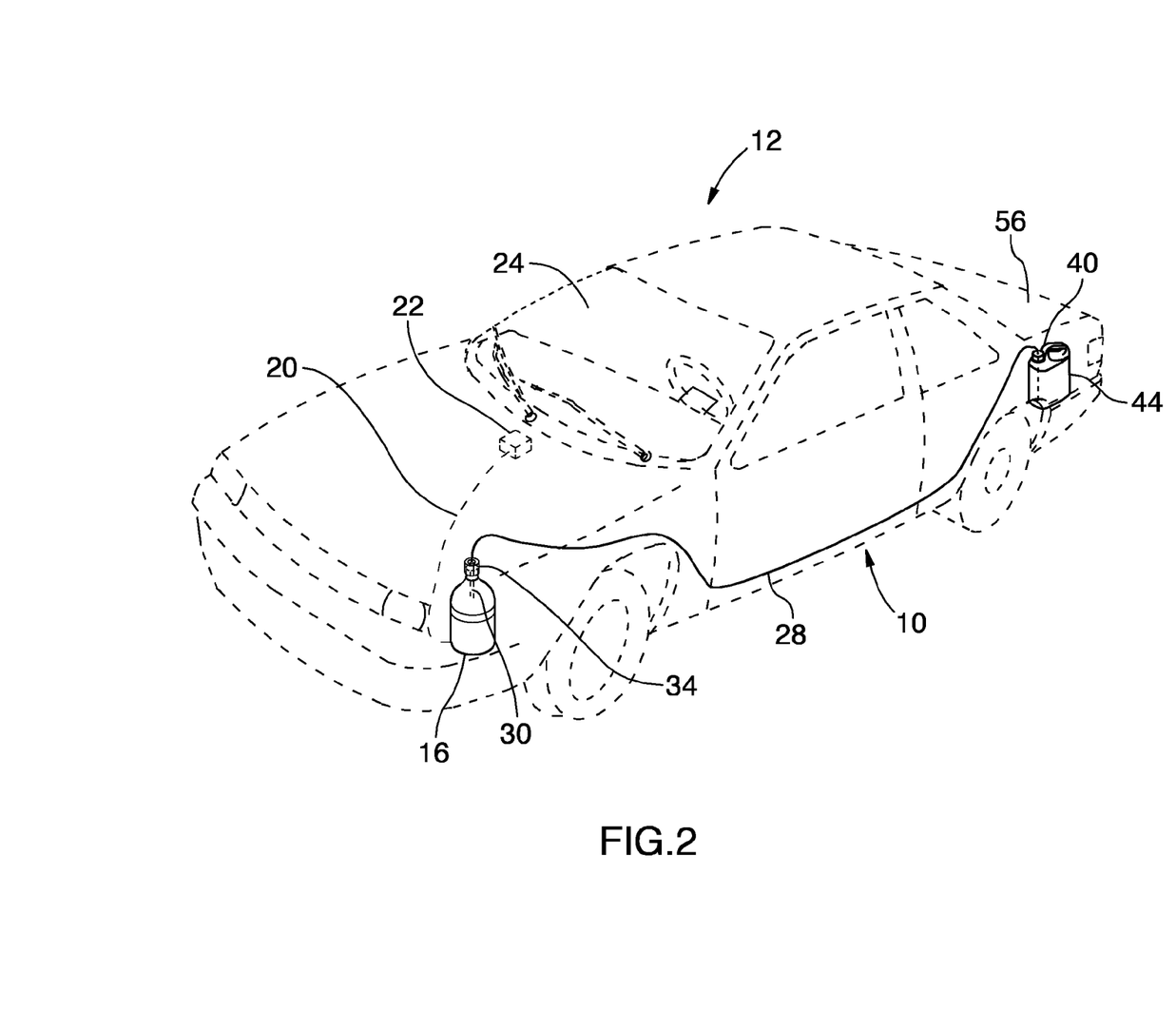
FIG. 2 is a front elevation perspective view of the vehicle shown in FIG. 1, the windshield washer fluid supplying system being shown in dotted lines.

Referring to FIGS. 1 and 2, there is shown a windshield washer fluid supplying system 10 for a vehicle 12, in accordance with one embodiment. As previously mentioned, the windshield washer fluid supplying system 10 is devised to be mounted on a vehicle 12 having a windshield washer device 14.

In the illustrated embodiment, the windshield washer device 14 comprises a reservoir 16 mounted in the vehicle 12 for storing washer fluid 18, a pump (not shown), tubing 20 and one jet nozzle 22 for spraying the washer fluid 18 on the windshield 24 of the vehicle 12. The tubing 20 has a first end connected to the reservoir 16 and a second end connected to the jet nozzle 22 for conveying the washer fluid 18 from the reservoir 16 to the jet nozzle 22.

The windshield washer device 14 also comprises a windshield washer control (not shown) mounted proximate the driver of the vehicle 12 and which may be activated upon request.

In the illustrated embodiment, the reservoir 16 is mounted at the fore part of the vehicle 12 but the skilled addressee will appreciate that other configurations may be considered.

The skilled addressee will also appreciate that more than one jet nozzle 22 may be used for spraying the washer fluid 18 on the windshield 24 of the vehicle 12.

Moreover, the vehicle 12 may also be provided with an additional jet nozzle (not shown) and the associated tubing (not shown) for spraying the washer fluid 18 on the back window 26 of the vehicle 12.

Still referring to FIGS. 1 and 2, the windshield washer fluid supplying system 10 comprises a supplying tube 28 having a first end portion 30 and a second end portion 32.

In one embodiment, the supplying tube 28 comprises caoutchouc or rubber tubing resistant to the vapors of the washer fluid but the skilled addressee will appreciate that other materials may be considered. For example, in a further embodiment, metal tubing may be envisaged.

Figure 4:
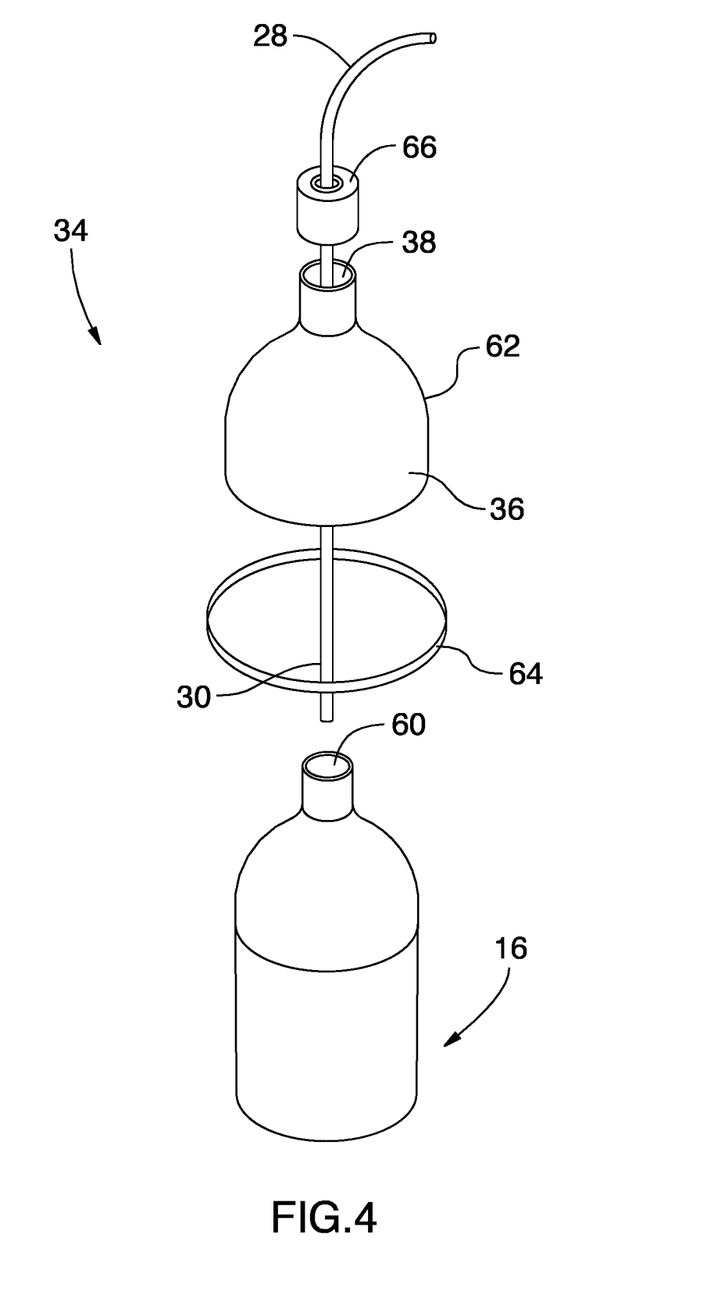
FIG. 4 if a front perspective exploded view showing a reservoir of a windshield washer device of a vehicle and a first end piece of a windshield washer fluid supplying system, in accordance with one embodiment.

Referring now to FIGS. 2 and 4, the windshield washer fluid supplying system 10 comprises a first end piece 34 comprising a portion 36 mountable on the reservoir 16 and an aperture 38 therethrough for receiving the first end portion 30 of the supplying tube 28 so that the first end portion 30 extends inside the reservoir 16, as better shown in FIG. 4.

In the illustrated embodiment, the reservoir 16 has a cylindrical shape but the skilled addressee will appreciate that various other shapes may be considered for the reservoir 16. In one embodiment, the first end piece 34 has a shape similar to the shape of the reservoir 16 but the skilled addressee will appreciate that various other embodiments may be considered.

Figure 3A:
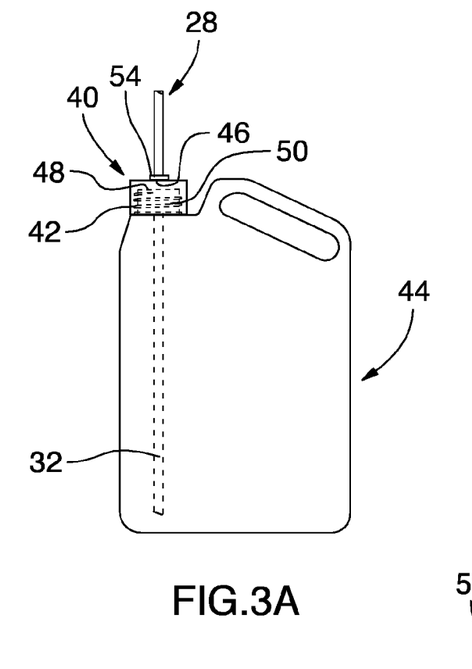
FIG. 3A is a side view of a container of windshield washer fluid.
Figure 3B:
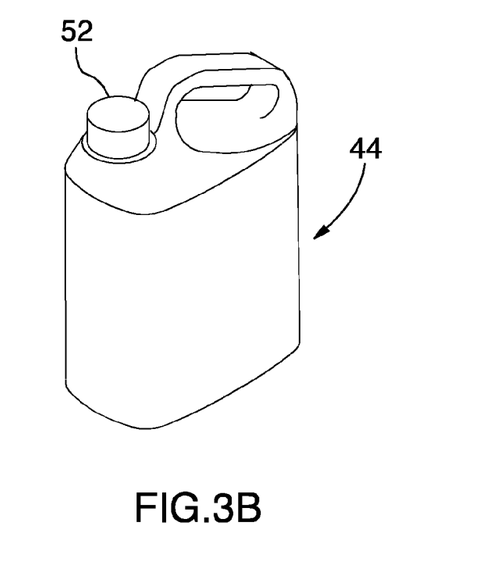
FIG. 3B is a front elevation perspective view of the container shown in FIG. 3A.

Referring now to FIGS. 2, 3A and 3B, the windshield washer fluid supplying system 10 also comprises a second end piece 40 comprising a portion 42 for mounting on a container 44 of washer fluid placed in the vehicle 12 and an aperture 46 therethrough for receiving the second end portion 32 of the supplying tube 28 so that the second end portion 32 of the supplying tube 28 extends inside the container 44 proximate a bottom portion thereof when the second end piece 40 is mounted on the container 44.

In one embodiment, the container 44 is a conventional container as currently available in most point of sales and is provided with an upper opening 48 having a screw thread 50 and a screw cap 52 screwed on the thread 50 for tightly closing the container 44.

In this embodiment, the second end piece 40 may comprise a screw cap similar to the screw cap 52 in which the aperture 46 has been made for receiving the second end portion 32 of the supplying tube 28. The skilled addressee will nevertheless appreciate that various other arrangements may be considered for the second end piece 40.

In one embodiment, means are provided for retaining the second end portion 32 of the supplying tube 28 in the aperture 46 of the second end piece 40. For non-limitative examples, a spring washer or a flexible ring 54 may be used. Alternatively, any means suitable for holding in place the second end portion 32 of the supplying tube 28 in the aperture 46 of the second end piece 40 may be considered, such as a tie-wrap or an adhesive element.

In the embodiment illustrated in FIGS. 1 and 2, the container 44 is placed in the trunk 56 of the vehicle 12, at the rear part of the vehicle 12, but it is worth mentioning that the container 44 may be disposed in any other suitable place inside the vehicle 12. Placing the container 44 inside the vehicle 12, for example in the trunk 56, enables the user to verify the quantity of fluid available in the container 44 in a fast and easy way, which is of great advantage. The refilling procedure is also improved since the container 44 may be replaced in an easy, fast and secure way.

For some vehicles, for example those provided with a hard top retractable in the trunk 56, it may be more practical to dispose the container 44 in the passenger compartment.

The skilled addressee will appreciate that the windshield washer fluid supplying system 10 may be installed on most vehicles using a windshield washer device 14. For example, it may be installed on trucks, tractors or even boats.

The skilled addressee will appreciate that once the supplying tube 28 has been conveniently mounted between the reservoir 16 and the container 44, a siphonage circuit is established between the reservoir 16 and the container 44 for enabling distribution of the washer fluid from the container 44 to the reservoir 16. In other words, the supplying tube 28 will slowly discharge the washer fluid 18 contained in the container 44 into the reservoir 16 the moment a certain quantity of washer fluid contained in the reservoir 16 is used for washing the windshield.

As previously mentioned, the second end portion 32 of the supplying tube 28 is mounted so as to project inside the container 44 proximate a bottom portion thereof. This arrangement advantageously enables the distribution of most of the washer fluid. Indeed, once the level of the washer fluid inside the container 44 is below the level of the second end portion 32, the siphonage circuit is opened and the distribution of washer fluid to the reservoir 16 stopped.

In a vehicle provided with the windshield washer fluid supplying system 10, when the "low windshield washer light" lights up, that means that both the container 44 and the reservoir 16 are nearly empty. After the user has replaced the empty container with a new one, the reservoir 16 will slowly fill up through the newly installed container.

In one embodiment, in order to start the siphonage circuit, the container 44 is installed in the vehicle so as to be positioned at a level higher than the level of the reservoir 16. As previously mentioned, in one embodiment, the container 44 is located in the trunk of the vehicle. In most of vehicles, the floor of the trunk is generally at a level higher than the level at which the reservoir 16 is mounted. However, if the system 10 is to be used in a vehicle wherein the reservoir is mounted at a level higher than the one of the floor of the trunk, it may be envisaged to provide an elevating supporting structure for installing the container 44 thereon.

Referring again to FIGS. 2 and 4, the reservoir 16 is generally provided with an upper opening 60 for enabling refilling of the reservoir 16 and a removable cap (not shown) for closing the opening 60 of the reservoir 16 after the conventional refilling procedure.

In order to install the windshield washer fluid supplying system 10, a user has to remove the cap of the reservoir 16 and to mount the first end piece 34 on the upper opening 60 of the reservoir 16.

In the embodiment illustrated in FIG. 4, the first end piece 34 comprises an inverted funnel 62 having a flared neck whose shape is adapted for snuggly mounting on the upper opening 60 of the reservoir 16. In one embodiment, the flared neck has a wide of about 3 inches which narrows to about 2 inches close to the aperture 38, thereby accommodating different shapes and sizes of the reservoir 16.

In one embodiment, the first end piece 34 may also comprise attaching means 64 for attaching the inverted funnel 62 on the reservoir 16. The attaching means 64 may comprise a tie wrap, a belt or any other suitable means adapted to secure the inverted funnel 62 to the reservoir 16. It could be envisaged that the attaching means 64 comprise an adhesive strap but attaching means that do not compromise integrity of the windshield washer device 14 may be preferred.

Still referring to FIG. 4, in the illustrated embodiment, the first end piece 34 also comprises means for holding in place the supplying tube 28 inside the aperture 38 of the first end piece 34 and inside the reservoir 16. For non-limitative examples, a spring washer or a flexible ring 66 may be used.

The skilled addressee will appreciate that various shapes and sizes may be envisaged for the first end piece 34, as long as it enables a suitable mounting of the first end portion 30 of the supplying tube 28 inside the reservoir 16.

Figure 5:
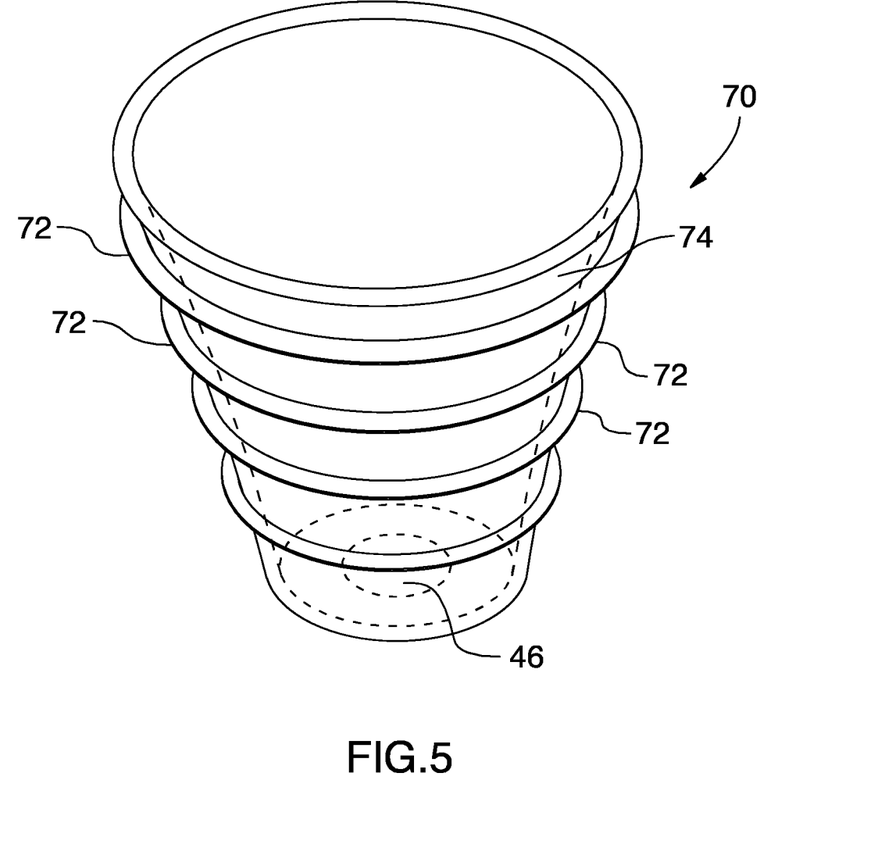
FIG. 5 is a side view of a first end piece of a windshield washer fluid supplying system, in accordance with another embodiment.

Referring now to FIG. 5, there is shown another embodiment of the first end piece 34. In this embodiment, the first end piece 34 comprises a non-inverted funnel 70 devised to be mounted into the upper opening 60 of the reservoir 16. The non-inverted funnel 70 has the aperture 46 extending in the bottom portion thereof and a plurality of protruding elements 72 extending on the outer side 74 of the non-inverted funnel 70 and projecting outwardly therefrom.

Each of these protruding elements 72 may comprise a disk extending around the outer side 74 of the non-inverted funnel 70. As illustrated, each of these protruding elements 72 extends at a different level on the non-inverted funnel 70. They therefore define different diameters on the non-inverted funnel 70 that are devised to accommodate different diameter of opening for the opening 60 of the reservoir 16.

In one embodiment, the non-inverted funnel 70 comprises a resilient material such as caoutchouc or rubber but the skilled addressee will appreciate that other arrangements may be considered, as long as the first end piece 34 enables holding in place the first end portion 30 of the supplying tube 28 inside the aperture 60 of the reservoir 16.

In one embodiment, the lower portion of the non-inverted funnel 70 having the aperture 46 is inserted inside the opening 60 of the reservoir 16. The first end portion 30 of the supplying tube 28 is inserted inside the aperture 46 and inside the reservoir 16 and hold in place thanks to a flexible ring 66. Then, the upper portion of the non-inverted funnel 70 may be folded on the upper portion of the reservoir 16, and then bound thereto with the attaching means.

Referring again to FIG. 4, the skilled addressee will appreciate that, in one embodiment, the inverted funnel 62 may be provided with an internal portion comprising a plurality of protruding elements (not shown) extending therearound, as the ones shown in FIG. 5. Each of these protruding elements may comprise a disk and extend at different levels in the flared neck in order to accommodate different types of opening 60 of the reservoir 16.

In a further embodiment, the supplying tube 28 may be provided with a Y-branch (not shown) enabling to connect two containers 44 to the windshield washer device 14. In this case, the supplying tube 28 still has the same first end portion 30 that the one previously described but the second end portion 32 has two ends, each being devised to be mounted inside the opening 46 of a corresponding container 44.

In this embodiment, two second end pieces 40 are used for simultaneously connecting the two containers 44 to the reservoir 16. This arrangement may be of great advantage in applications in which an even more increased autonomy of washer fluid is required.

The skilled addressee will appreciate that the second end portion 32 of the supplying tube 28 may have more than two ends for connecting more than two containers 44.

Referring again to FIGS. 1 and 2, in one embodiment, the middle portion of the supplying tube 28 is installed inside the vehicle 12 proximate the bunch of electrical conductors (not shown) that are installed between the fore part of the vehicle and the rear part of the vehicle. In the illustrated embodiment, the supplying tube 28 is installed on the bottom of the vehicle, through the passenger compartment. The skilled addressee will nevertheless appreciate that other arrangements may be considered. For example, the middle portion of the supplying tube 28 may be installed in the top of the vehicle. Moreover, it may also be envisaged that a part of the middle portion of the supplying tube 28 be installed below the frame of the vehicle. In this case, the skilled addressee will appreciate that this part of the supplying tube 28 may comprise metal tubing. The skilled addressee will also appreciate that for a given application, the whole length of the supplying tube 28 may be made of metal.

In one embodiment, the supplying tube 28 has a length of about 26 feet but the skilled addressee will appreciate that other lengths may be used, depending on the type of vehicle on which the system 10 is mounted.

In a further embodiment, grommets (not shown) mounted in convenient places may be used for preventing damages to the supplying tube 28.

The skilled addressee will appreciate that the system 10 has been primarily designed to be mounted on existing vehicles. He will however also appreciate that it may be envisaged to mount the system 10 during the manufacturing of the vehicle. In such a case, a manufacturer may envisage to provide another aperture in the reservoir 16 particularly devised to receive the supplying tube 28. This aperture may be provided on a side of the reservoir 16 and is not limited to be on the upper portion of the reservoir 16.

In another further embodiment, the system 10 is used in combination with a rack (not shown) adapted for holding the container 44 in place inside the trunk or the passenger compartment of the vehicle. The rack may be adapted to hold a plurality of containers.

Figure 6:
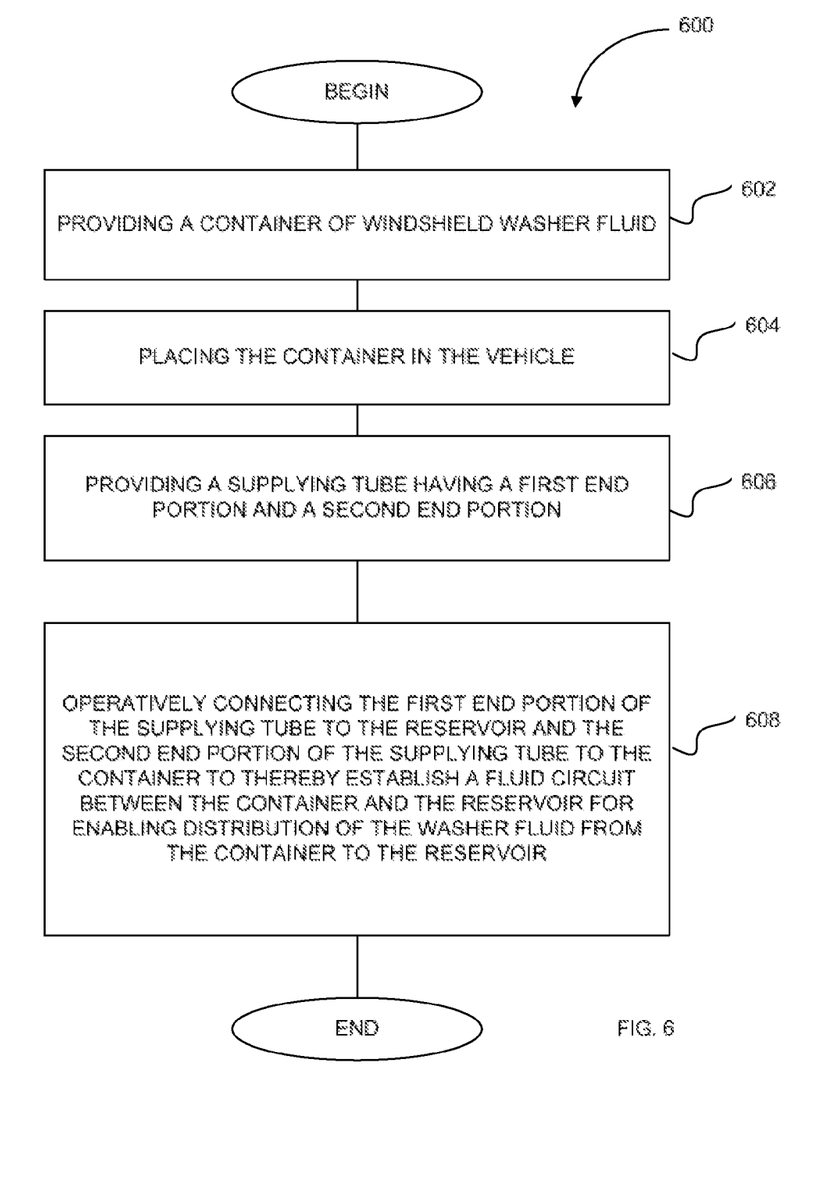
FIG. 6 is a flowchart of a method for supplying windshield washer fluid to a windshield washer device of a vehicle, in accordance with one embodiment.

According to another aspect, there is also provided a method for supplying windshield washer fluid to a windshield washer device of a vehicle having a reservoir, as illustrated in FIG. 6.

According to processing step 602, a container of windshield washer fluid is provided.

According to processing step 604, the container is placed in the vehicle.

According to processing step 606, a supplying tube having a first end portion and a second end portion is provided.

According to processing step 608, the first end portion of the supplying tube is operatively connected to the reservoir and the second end portion of the supplying tube is operatively connected to the container to thereby establish a fluid circuit between the container and the reservoir for enabling distribution of the washer fluid from the container to the reservoir.

According to yet another aspect, the system 10 may be provided in kit form for being sold in stores and mounted by the user, which is of great advantage.

Although the above description relates to specific preferred embodiments as presently contemplated by the inventor, it will be understood that the invention in its broad aspect includes mechanical and functional equivalents of the elements described herein.

The invention claimed is:

1. A windshield washer fluid supplying system for a vehicle having a windshield washer device comprising a reservoir mounted in said vehicle for storing washer fluid, said supplying system comprising:
   a supplying tube having a first end portion and a second end portion;
   a first end piece comprising a portion mountable on said reservoir and an aperture therethrough for receiving the first end portion of the supplying tube so as to enable fluid communication between the first end portion of the supplying tube and the reservoir; and
   a second end piece comprising a portion adapted for mounting on a container of washer fluid placed in said vehicle and an aperture therethrough for receiving the second end portion of the supplying tube so that the second end portion of the supplying tube extends inside said container proximate a bottom portion thereof when said second end piece is mounted on said container, thereby establishing a siphonage circuit between the reservoir and the container with the supplying tube for enabling distribution of said washer fluid from the container to the reservoir,
   wherein said first end piece comprises a non-inverted funnel adapted to be mounted inside the upper opening of the reservoir, the aperture of the first end piece extending in a lower portion thereof, wherein said non-inverted funnel comprises a plurality of protruding elements extending on an outer side thereof and projecting outwardly thereof.

2. The windshield washer fluid supplying system as claimed in claim 1, wherein each of the container and the reservoir comprises a corresponding upper opening.

3. The windshield washer fluid supplying system as claimed in claim 1, wherein said supplying tube comprises caoutchouc tubing.

4. The windshield washer fluid supplying system as claimed in claim 1, wherein said supplying tube comprises rubber tubing.

5. The windshield washer fluid supplying system as claimed in claim 1, wherein said supplying tube comprises metal tubing.

6. The windshield washer fluid supplying system as claimed in claim 1, wherein said container comprises an upper opening having a screw thread and a screw cap screwable on the screw thread for tightly closing the container, said cap comprising a cap aperture for receiving therethrough the second end portion of the supplying tube.

7. The windshield washer fluid supplying system as claimed in claim 6, wherein said cap aperture has a size adapted for snuggly receiving the second end portion of the supplying tube.

8. The windshield washer fluid supplying system as claimed in claim 1, wherein said non-inverted funnel comprises a resilient material.

9. The windshield washer fluid supplying system as claimed in claim 1, wherein each of said protruding elements comprises a disk extending around the non-inverted funnel.

10. The windshield washer fluid supplying system as claimed in claim 1, wherein the non-inverted funnel has a lower portion insertable in the upper opening of the reservoir and an upper portion foldable on the reservoir.

11. The windshield washer fluid supplying system as claimed in claim 1, wherein said first end piece comprises first end piece attaching means for attaching said first end piece on the reservoir.

12. The windshield washer fluid supplying system as claimed in claim 11, wherein said first end piece attaching means is selected from the group consisting of a spring washer, a flexible ring, a tie-wrap and an adhesive strap.

13. The windshield washer fluid supplying system as claimed in claim 1, wherein the second end portion of the supplying tube comprises a Y-branch having a plurality of ends for respectively connecting said container and a plurality of additional containers thereto.

14. The windshield washer fluid supplying system as claimed in claim 1, further comprising a rack mountable inside the vehicle for holding the container in place.

15. The windshield washer fluid supplying system as claimed in claim 1, wherein said vehicle is selected from a group consisting of a car, a truck, a tractor and a boat.

16. A kit of a windshield washer fluid supplying system for a vehicle having a windshield washer device comprising a reservoir mounted in said vehicle for storing washer fluid, said supplying system comprising:
   a supplying tube having a first end portion and a second end portion;
   a first end piece comprising a portion mountable on said reservoir and an aperture therethrough for receiving the first end portion of the supplying tube so as to enable fluid communication between the first end portion of the supplying tube and the reservoir when the first end piece is mounted on said reservoir; and
   a second end piece comprising a portion adapted for mounting on a container of washer fluid placed in said vehicle and an aperture therethrough for receiving the second end portion of the supplying tube so that the second end portion of the supplying tube extends inside said container proximate a bottom portion thereof when said second end piece is mounted on said container, thereby establishing a siphonage circuit between the reservoir and the container with the supplying tube for enabling distribution of said washer fluid from the container to the reservoir,
   wherein said first end piece comprises a non-inverted funnel adapted to be mounted inside the upper opening of the reservoir, the aperture of the first end piece extending in a lower portion thereof, wherein said non-inverted funnel comprises a plurality of protruding elements extending on an outer side thereof and projecting outwardly thereof.

* * * * *